United States Patent [19]

Zubricki

[11] 4,122,721

[45] Oct. 31, 1978

[54] WATER SAMPLING BUCKET

[76] Inventor: Theodore Zubricki, 30 Sanger St., Braintree, Mass. 02184

[21] Appl. No.: 754,971

[22] Filed: Jan. 17, 1977

[51] Int. Cl.² .............................................. G01K 13/12
[52] U.S. Cl. ................................. 73/354; 73/425.4 R
[58] Field of Search ................ 73/354, 425.4 R, 374; 206/306

[56] References Cited

U.S. PATENT DOCUMENTS

| 1,119,627 | 12/1914 | Mueller | 73/354 |
| 1,876,592 | 9/1932 | Beard | 73/354 |
| 2,028,888 | 1/1936 | Williams | 73/354 |
| 3,273,394 | 9/1966 | Chaney | 73/354 |

Primary Examiner—S. Clement Swisher
Assistant Examiner—Denis E. Corr

[57] ABSTRACT

A water sampling bucket for use in determining water surface temperature and salinity in the ocean bays and rivers having a thermometer supported at one end within a rubber grommet, and the mercury bulb end submerged in a water sampling portion, which is clear plastic where the temperature markings occur; and containing an opening at its bottom end for receiving sampled water, and encompassing the lower end of the thermometer which is coated with a heavy impact resistant material.

2 Claims, 4 Drawing Figures

WATER SAMPLING BUCKET

The Coast Guard and numerous other government bodies constantly sample water particularly in and around bays to determine its temperature and its salinity. What is normally done is that a bucket is thrown overboard and a sample of the surface water is brought up to the ship, vessel or dock and a thermometer is inserted in the water sample in order to determine its temperature.

In tropical areas where the sun is very hot the water sample as it is removed from the ocean because of evaporation, rapidly changes its temperature. The sample in this way, of course, does not reflect the surface water temperature. Again in the Artic and near by areas samples of the water, once removed from the ocean surface, ice up and their accuracy again is completely lost. The present invention selects a carefully controlled sample in a thermly shielded container which prevents loss of temperature as a result of the air or sun exposure for a long enough period of time to enable an accurate measurement to be made.

Sampling buckets in order to gather enough surface water must readily enter the surface of the water in order to fill up to the prescribed level. After the bucket is full it must not inadvertently spill out. Accordingly the present inventor has discovered a small drop bucket on a relatively long thin shaft provides the appropriate balance when weighted on the extreme end.

Another problem with sampling buckets is its ability to pick up a controlled quantity of water and at the same time not be damaged by destructive impact. Accordingly, an inner bucket of rigid plastic material, covered by a very dense rubber, absorbs all impact and prevents the unit from breaking up or cracking as it is bounced about striking the side of a vessel.

In order to obtain the temperature of the water, a very accurate and expensive mecury thermometer is used. However, mecury thermometers are fragile and readily broken. The present inventor has discovered that the shaft, if secured at one end, provides easy access to the readings on the thermometer and prevents it from breaking. The thermometer extends through the support shaft with the bulb emerging in the center of the bucket where the salt water temperature must be determined. As the bucket is being raised, sufficient time elapses to record the temperature accurately. It was discovered that the thermometer could be centrally suspended and held by a compressable rubber grommet which encircles the thermometer. No impact is translated through the cushioned bucket up through the support shaft and into the thermometer through the grommet thereby extending the life of the thermometer indefinitely and avoiding breakage. Moreover, accurate readings have been more consistent because the mecury does not separate due to impact.

Therefore, an object of the present invention is to provide a readily submersible water sampling bucket which does not change temperature for extended periods of time, once in the air and/or exposed to direct sun.

Another object of the present invention is to provide a thermometer securely held at one end with the bulb immersed in a water sample for accurate temperature readings.

Another object of the present invention is to provide a water sampling bucket for connection to a line which has a hollow shaft containing a thermometer suspended therein, a sampling bucket at one end of rigid plastic material encased at its bottom portion with a thick resilient rubber sheathing to protect it from impact.

Other objects, features and advantages of the present invention will be readily understood from the attached drawings of which:

Figure 1:
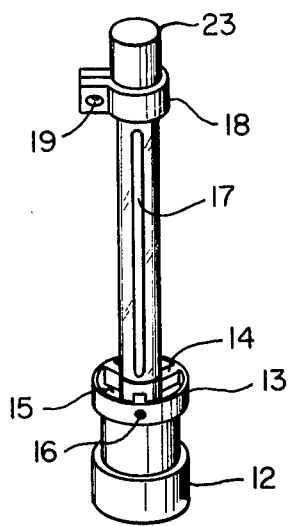
FIG. 1 is a perspective view of the present invention.

Referring now to FIG. 1 we see bucket 13. The bottom of the bucket is encased in a rubber sheath 12 which absorbs impact. The thickness of this rubber sheath is larger at the base than in the sides. The base is approximately ½ inch thick while the sheath sides are ⅛ inch thick. The rigid plastic body of the sampling bucket can be any number of thermoplastic materials. A transparent plastic shaft that is affixed to the non transparent base has three legs 14 which extend out into intimate contact with the bucket 13 providing openings between the contacting points or legs which are concentric with the bucket and which are utilized to affix the bucket by means of screw 16. Only one screw is shown, however, there would be 3 to connect the three centric points of the shaft to the bucket. "Lucite" is utilized because of its transparency, but any transparent plastic will due. "Lucite" is a trade named product of the General Electric Company. A slot 17 is cut almost the entire length of the shaft in order to provide visual access to the thermometer which extends down the shaft into the bucket. At the top of the shaft is an enlarged portion 18 which has a hole 19 to receive a line. The device can be thrown over the side of the boat to obtain a sample of water. Cap 23 screws into upper sections 18 which will be shown more fully.

Figure 2:
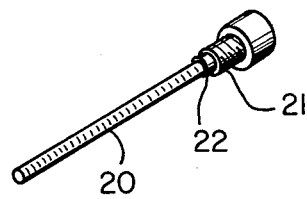
FIG. 2 is a thermometer held at one end for insertion into the present invention.

Referring now to FIG. 2 we see a thermometer shaft 20 with markings thereon. And a rubber grommet connection 22 in the cap 23 shown in FIG. 1. The thermometer is inserted into the water sampling bucket and goes right directly through the shaft and into the water sample.

Figure 3:
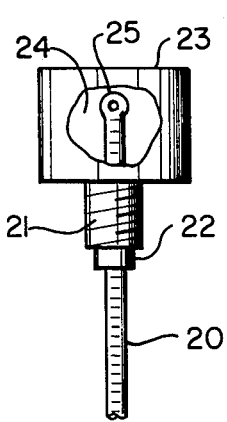
FIG. 3 is a detailed view of the thermometer holding portion of the present invention.

Referring now to FIG. 3 we see a sectional view of cap 23. The inner portion 24, is hollow to receive the thermometer. The threaded end 21 is designed to mate with the engaged portion 18 of the shaft. When it is screwed in, the rubber grommet of a very soft material 22, presses on a concentric shoulder within 18, squeezing in uniformly about the thermometer holding it rigidly in place. The thermometer 20 is shown in section. The thermometer end 25 is flared out and has a hole in it to receive a string or wire. Ordinarily the thermometer is left loosely hanging from the string in order to read a termperature. However, these thermometers are expensive and if they are allowed to swing around they will strike the sides of the bucket and break. With the present invention the rubber grommet holds the thermometer firmly in place and prevents damage to the thermometer thereby extending the life of the device and reducing the over all cost of temperature measuring considerably.

Figure 4:
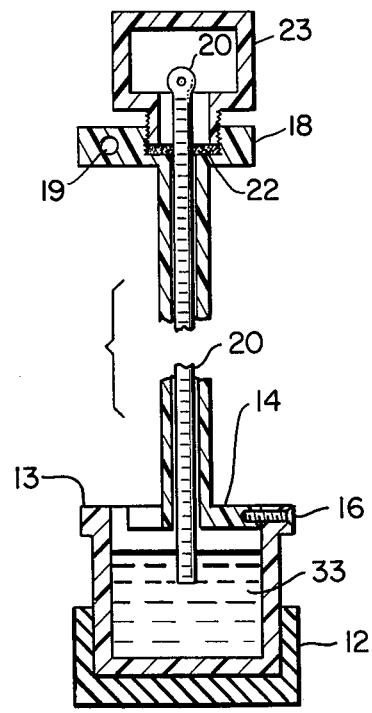
FIG. 4 is a detailed sectional view of the bucket section showing the bulb measuring the temperature of a water sample.

Referring now to FIG. 4 we see a sectional view of the bottom of the bucket. The shaft of the thermometer extends into the fluid 33 contained in the bucket 13. After the temperature is recorded the fluid is poured out of the bucket by way of the notch 15 much the same as shown in FIG. 1. The unit is ready to take a new temperature as it is thrown over the side to sink into the water to refill the bucket 13 again. A new temperature is read and the saltity of the fluid is checked.

Although I have described my invention with reference to specific apparatus, I do not want to be limited thereby. I only wish to be limited by the appended claims in which:

I claim:

1. A water sampling bucket comprising, a plastic bucket for receiving water samples, a rubber sheath for encasing the bottom of the bucket to protect it from impact, a thin extended shaft for holding said bucket upright, said shaft affixed said bucket at multiple concentric points permitting the free entry of water into said bucket, said shaft having means for receiving a line to enable said device to be thrown into the water to pick up a sample of water, said shaft having an open slot along its length, a thermometer, means for holding said thermometer concentric said shaft whereby the bulb of said thermometer is spacially placed mid center in said bucket for measuring water temperature, wherein said thermometer holding means includes a soft rubber grommet for encircling said thermometer, a threaded cap with a concentric opening to receive said grometted thermometer, said shaft having a threaded concentric opening for receiving said threaded cap and a shoulder for pressing said rubber grommet wherein the cap is tightened.

2. A water sampling bucket according to claim 1 wherein said bucket has a notch to enable easy pouring to empty said bucket for salinity testing.

* * * * *